United States Patent
van Velzen et al.

(10) Patent No.: US 9,946,576 B2
(45) Date of Patent: *Apr. 17, 2018

(54) DISTRIBUTED WORKFLOW EXECUTION

(71) Applicant: MICROSOFT TECHNOLOGY LICENSING, LLC, Redmond, WA (US)

(72) Inventors: Danny van Velzen, Redmond, WA (US); Jeffrey van Gogh, Redmond, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,008

(22) Filed: Dec. 12, 2016

(65) Prior Publication Data

US 2017/0090989 A1    Mar. 30, 2017

Related U.S. Application Data

(63) Continuation of application No. 12/775,688, filed on May 7, 2010, now Pat. No. 9,524,192.

(51) Int. Cl.
 *G06F 9/46* (2006.01)
 *G06F 9/50* (2006.01)
 *G06F 9/44* (2018.01)
(52) U.S. Cl.
 CPC .............. *G06F 9/5038* (2013.01); *G06F 8/70* (2013.01); *G06F 9/5083* (2013.01)

(58) Field of Classification Search
 None
 See application file for complete search history.

(56) References Cited

U.S. PATENT DOCUMENTS

| | | |
|---|---|---|
| 6,816,902 B1 | 11/2004 | Bandat et al. |
| 7,539,976 B1 | 5/2009 | Ousterhout et al. |
| 8,037,453 B1 | 10/2011 | Zawadzki |
| 2004/0194060 A1 | 9/2004 | Ousterhout et al. |
| 2006/0015873 A1 | 1/2006 | Dettinger et al. |
| 2006/0112388 A1 | 5/2006 | Taniguchi et al. |
| 2008/0114870 A1 | 5/2008 | Pu |
| 2009/0106730 A1 | 4/2009 | Mockford |
| 2009/0241117 A1 | 9/2009 | Dasgupta et al. |
| 2010/0077387 A1 | 3/2010 | Callaghan et al. |
| 2011/0238458 A1 | 9/2011 | Purcell et al. |

OTHER PUBLICATIONS

"Accelerate Make-Based Builds", Retrieved From <<https://web.archive.org/web/20100126035530/http://www.xoreax.com/make.htm>>, Retrieved Date: Apr. 19, 2010, 1 Page.

(Continued)

*Primary Examiner* — Emerson C Puente
*Assistant Examiner* — Paul V Mills
(74) *Attorney, Agent, or Firm* — Workman Nydegger

(57) ABSTRACT

A workflow is designated for execution across a plurality of autonomous computational entities automatically. Among other things, the cost of computation is balanced with the cost of communication among computational entities to reduce total execution time of a workflow. In other words, a balance is struck between grouping tasks for execution on a single computational entity and segmenting tasks for execution across multiple computational entities.

23 Claims, 10 Drawing Sheets

(56) References Cited

OTHER PUBLICATIONS

"Cabie Automated Build System", Retrieved From <<http://www.yolinux.com/TUTORIALS/CabieBuildSystem.html>>, Retrieved Date: Apr. 17, 2010, 19 Pages.
"Different as Distribution", Retrieved From <<http://www.t2-project.org/handbook/html/t2.intro.different.distribution.html>>, Retrieved Date: Apr. 17, 2010, 3 Pages.
"Final Rejection Issued in U.S. Appl. No. 12/775,688", dated May 2, 2014, 26 Pages. (MS# 328928-US-NP).
"Final Rejection Issued in U.S. Appl. No. 12/775,688", dated Nov. 19, 2015, 17 Pages. (MS# 328928-US-NP).
"Final Rejection Issued in U.S. Appl. No. 12/775,688", dated Feb. 1, 2013, 16 Pages. (MS# 328928-US-NP).
"Non Final Rejection Issued in U.S. Appl. No. 12/775,688", dated Aug. 30, 2012, 13 Pages. (MS# 328928-US-NP).
"Non Final Rejection Issued in U.S. Appl. No. 12/775,688", dated Mar. 26, 2015, 18 Pages. (MS# 328928-US-NP).
"Non Final Rejection issued in U.S. Appl. No. 12/775,688", dated Sep. 25, 2013, 23 Pages. (MS# 328928-US-NP).
"Notice of Allowance Issued in U.S. Appl. No. 12/775,688", dated Sep. 12, 2016, 21 Pages. (MS# 328928-US-NP).
Zhu, et al., "A Resource Allocation Approach for Supporting Time-Critical Applications in Grid Environments", In IEEE International Symposium on Parallel & Distributed Processing, May 23, 2009, 12 Pages.
"First Office Action and Search Report Issued in Chinese Patent Application No. 201110127071.4", dated Feb. 11, 2015, 13 Pages. (MS# 328928-CN-NP).
"Fourth Office Action Issued in Chinese Patent Application No. 201110127071.4", dated May 17, 2016, 12 Pages. (MS# 328928-CN-NP).
"Second Office Action Issued in Chinese Patent Application No. 201110127071.4", dated Aug. 26, 2015, 9 Pages. (MS# 328928-CN-NP).
"Third Office Action Issued in Chinese Patent Application No. 201110127071.4", dated Dec. 30, 2015, 13 Pages. (MS# 328928-CN-NP).
Bausch, et al., "Programming for Dependability in a Service-based Grid", In Proceedings of the 3st International Symposium on Cluster Computing and the Grid, May 12, 2003, 8 Pages.
Binder, et al., "Optimal Workflow Execution in Grid Environments", Retrieved from <<https://pdfs.semanticscholar.org/a97e/482e0fd80740360fda1ecd3054425993b2b0.pdf>>, Dec. 31, 2005, 18 Pages.
Cao, et al., "Grid Flow: Workflow Management for Grid Computing", In IEEE/ACM International Symposium on Cluster Computing and the Grid, May 2003, pp. 198-205.
Dong, et al., "A Framework for Optimizing Distributed Workflow Executions", In 7th international Workshop on Database Programming Languages, Jan. 2000, 16 Pages.
Dong, et al., "Hybrid Checkpointing Using Emerging Nonvolatile Memories for Future Exascale Systems", In Journal—ACM Transactions on Architecture and Code Optimization, vol. 8, Issue 2, Jul. 1, 2011, 29 Pages.
Erik-Svensson, et al., "MPreplay Architecture Support for Deterministic Replay of Message Passing Programs on MessagePassing Many-core Processors", In Coordinated Science Laboratory Report No. CRHC-09-06, Sep. 2009, 14 Pages.
Floros, et al., "Query Processing Over the Grid: The Role of Workflow Management", In Grid Computing: Achievements and Prospects, Apr. 2008, 13 Pages.
Gerofi, et al., "Workload Adaptive Checkpoint Scheduling of Virtual Machine Replication", In IEEE 17th Pacific Rim International Symposium on Dependable Computing, Dec. 12, 2011, 10 Pages.
Hac, et al., "A Distributed Load Building Algorithm for Parallel Compilation of Files in a Software Application", In Proceedings of Fourth International Conference on Software Engineering and Knowledge Engineering, Jun. 1992, 7 Pages.
Narayanasamy, et al., "BugNet Continuously Recording Program Execution for Deterministic Replay Debugging", In Proceedings of the 32nd Annual International Symposium on Computer Architecture, Jun. 4, 2005, 12 Pages.
Pavlo, et al., "The NMI Build & Test Laboratory: Continuous Integration Framework for Distributed Computing Software", In 20th Large Installation System Administration Conference, Dec. 2006, 12 Pages.
"International Search Report and Written Opinion Issued in PCT Application No. PCT/US2013/042788", dated Sep. 5, 2013, 7 Pages. (MS# 346232-WO-PCT).
"International Search Report and Written Opinion issued in PCT Application No. PCT/US2013/073935", dated Mar. 31, 2014, 11 Pages. (MS# 346227-WO-PCT[2]).
"International Search Report and Written Opinion Issued in PCT Application No. PCT/US2013/075876", dated Apr. 7, 2014, 8 Pages. (MS# 346227-WO-PCT).
Reidl, Reinhard, "Workload Modeling for Load Balancing in Distributed DB/DC Transaction Processing", Retrieved From <<http://web.archive.org/web/20060524122931/http://www.ifi.unizh.ch/egov/rr_2.pdf>>, Retrieved on: Aug. 13, 2012, 36 Pages.
Resano, et al., "Specific Scheduling Support to Minimize the Reconfiguration Overhead of Dynamically Reconfigurable Hardware", In Proceedings of 41st Design Automation Conference, Jun. 7, 2004, pp. 119-124.
Sahai, et al., "Automated Policy-Based Resource Construction in Utility Computing Environments", In IEEE/IFIP Network Operations and Management Symposium, Apr. 23, 2004, pp. 381-393.
Shankar, et al., "Data Driven Workflow Planning in Cluster Management Systems", In Proceedings of the 16th International Symposium on High Performance Distributed Computing, Jun. 25, 2007, pp. 127-136.
Smith, Kevin W., "Distributed Loadbuilds", Retrieved From <<http://www.ddj.com/architect/184405385>>, Jul. 1, 2003, 5 Pages.
Srivatsa, et al., "A Policy Evaluation Tool for Multisite Resource Management", In IEEE Transactions on Parallel and Distributed Systems, vol. 19, Issue 10, Oct. 2008, pp. 1352-1366.
Tsangaris, et al., "Dataflow Processing and Optimization on Grid and Cloud Infrastructures", In IEEE Data Engineering Bulletin, Mar. 2009, 8 Pages.
Vydyanathan, et al., "A Duplication Based Algorithm for Optimizing Latency Under Throughput Constraints for Streaming Workflows", In 37th International Conference on Parallel Processing, Sep. 9, 2008, pp. 254-261.
Wright, Derek, "4.1 An Introduction to Condor's ClassAd Mechanism", Retrieved From http://www.mi.infn.it/condor/manual/4_1Introduction_Condor_s.html>>, Retrieved on: Nov. 6, 2015, 6 Pages.
Wu, et al., "Error Recovery in Shared Memory Multiprocessors Using Private Caches", In IEEE Transactions on Parallel and Distributed Systems, vol. 1, Issue 2, Apr. 1, 1990, 10 Pages.
Xu, et al., "A Multiple QoS Constrained Scheduling Strategy of Multiple Workflows for Cloud Computing", In IEEE International Symposium on Parallel and Distributed Processing with Applications, Aug. 2009, 6 Pages.
Xu, et al., "Resource Planning for Massive Number of Process Instances", In Proceedings of the Confederated International Conferences, CoopIS, DOA, IS, and ODBASE on the Move to Meaningful Internet Systems: Part I, Nov. 7, 2009, pp. 219-236.
Yu, et al., "QoS-based Scheduling of Workflows on Global Grids", Submitted in Total Fulfilment of the Requirements for the Degree of Doctor of Philosophy, In Department of Computer Science and Software Engineering, Australia, Oct. 2007, 17 Pages.
"Final Office Action Issued in Chinese Patent Application No. 201110127071.4", dated Feb. 4, 2017, 8 Pages. (MS#328928-CN-NP).

DISTRIBUTED WORKFLOW EXECUTION

CROSS-REFERENCE TO RELATED APPLICATIONS

This application is a continuation of U.S. patent application Ser. No. 12/775,688 filed on May 7, 2010, entitled "DISTRIBUTED WORKFLOW EXECUTION," which issued as U.S. Pat. No. 9,524,192 on Dec. 20, 2016, and which application is expressly incorporated herein by reference in its entirety.

BACKGROUND

Workflow systems represent the application of technology to process management. A workflow is an organized set of interrelated tasks that define the operational aspect of a process or procedure. In particular, a workflow can define how tasks are structured, responsible entities, and relative ordering of tasks, among other things. Consequently, a workflow facilitates automated design, control, and monitoring of processes.

One widely known workflow is an enterprise workflow, which automates business processes such that documents, information, and/or tasks are passed to individuals for action in accordance with procedural rules. For instance, an individual can perform some designated work in a sequence, and subsequently, upon completion, work by others can be initiated. In effect, delivery of work is automated and controlled based on completion of precedent tasks. By way of example, a loan evaluation or approval process could be represented as a workflow.

Workflow can also be employed within the context of computer systems and functionality associate therewith, rather than solely human related tasks. By way of example, a specialized workflow system, known as a build system, can be employed to facilitate program development or in other words a build.

A build system enables a wide variety of program development tasks to be scripted and executed as a build including compilation of source code into binary code, testing, and deployment, among other things. While it is easy to invoke development operations from a command prompt for a single file, it is exponentially more difficult to similarly initiate such operations on a large number of files with complex dependencies, as is typically the case. A build system is designed to aid in this situation by enabling developers to describe and subsequently initiate execution of a series of calls to discrete units of code that each have a particular function multiple times. For instance, a build system can allow a program to be quickly re-compiled when a change is made to one or more component source files.

Workflows and builds more specifically continue to grow in terms of both size and complexity. Workflow execution time is dependent upon the size and complexity of workflows. Consequently, workflow execution time continues to expand.

BRIEF SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally concerns optimizing workflow execution. A workflow can be scheduled for execution across a plurality of autonomous computational entities automatically. More specifically, workflow tasks can be grouped into sets for execution on the plurality autonomous computational entities as a function of computational cost and communication cost, among other factors. Where a workflow specifies task and item dependencies explicitly, the dependencies can be utilized to perform fine-grained grouping. Further, such dependencies can also be employed to constrain re-execution to portions of the workflow affected by a failure associated with one or more of the plurality of autonomous computational entities, for instance, among other things.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward execution of workflows across multiple autonomous computational entities (e.g., computers, virtual machines . . . ). Workflows are growing in size and complexity. Consequently, workflow execution times continue to expand. This is problematic at least because workflow modification, for example to add functionality or address a defect, becomes increasingly costly. By concurrently executing a workflow across a plurality of autonomous computational entities, execution time can be substantially reduced thereby decreasing modification expense, among other things.

A number of factors can be considered to determine an optimal distribution automatically. For example, the cost of computation and the cost of communication can be taken into account. More specifically, a balance can be struck between grouping tasks on a single computational entity and segmenting tasks for execution across multiple computational entities. Furthermore, grouping and/or segmentation can be fine-grained by taking advantage of explicitly and precisely specified workflow dependencies as opposed to workflows with implicit or hidden and/or coarse-grained dependencies.

Workflow dependencies can also be exploited to handle a by-product of distributed systems, namely failure. Rather than requiring a workflow to be re-executed from the beginning, only a portion of the workflow comprising tasks that depend on a failed computation can be rescheduled. In addition, state information across a previous run of the same or different workflow can be employed to reduce further the amount of work that needs to be performed to recover from a failure or otherwise execute/re-execute a workflow and return to a consistent state.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
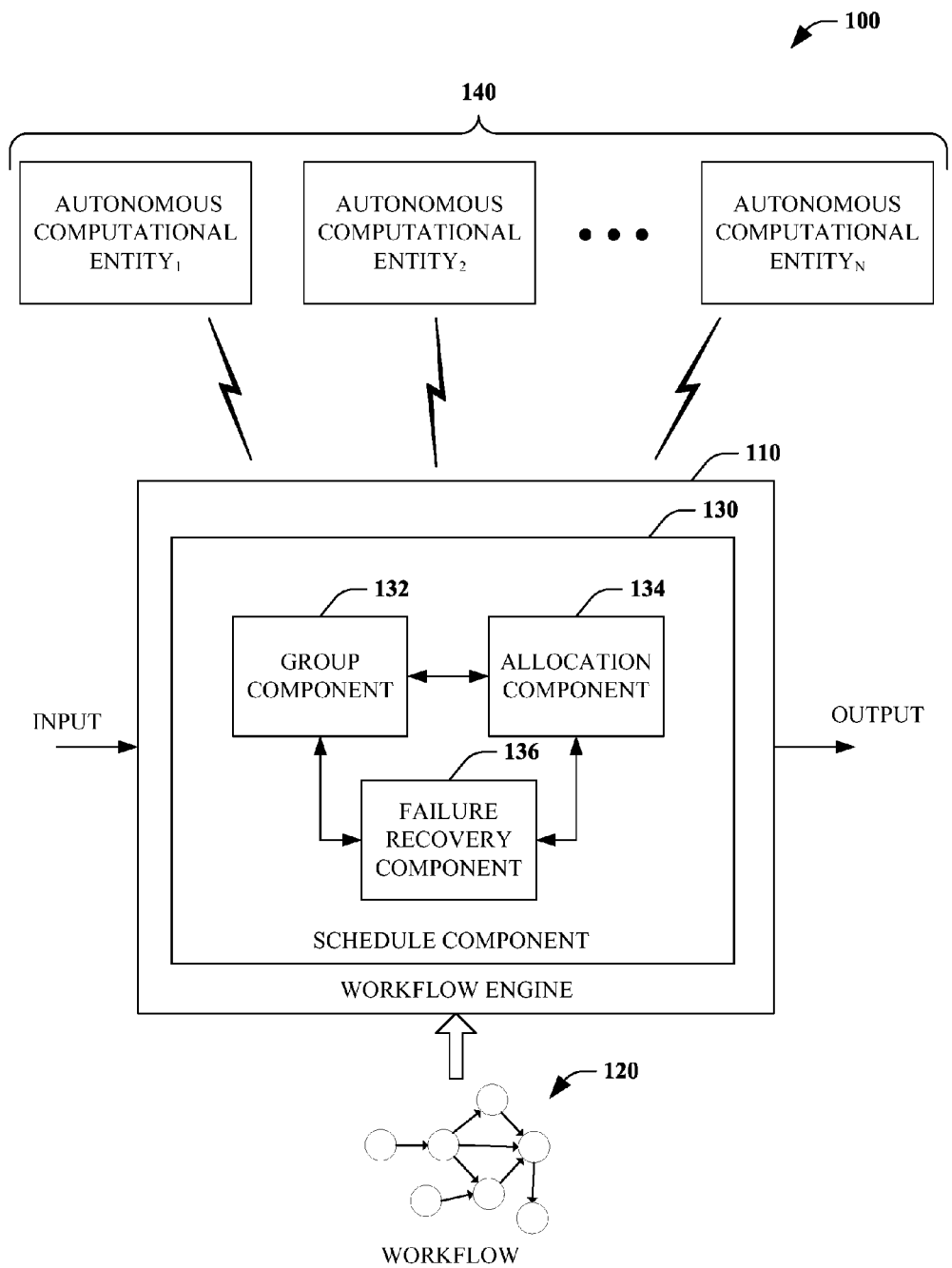
FIG. 1 is a block diagram of a workflow system.

Referring initially to FIG. 1, a workflow system 100 is illustrated. The workflow system 100 includes a workflow engine 110 that generally functions to execute a workflow 120 comprising a set of interrelated tasks and items that define a process or procedure. A task describes an action to be taken (e.g., copy, delete, invoke, rewrite . . . ), and furthermore defines dependencies between itself, inputs, and outputs. Items can be task input and/or output (e.g., file, document, property, literal, executable . . . ). For instance, a task can consume as input one or more items and optionally produce as output one or more items. Alternatively, a task can produce as output one or more items without receiving one or more items as input.

Moreover, the workflow engine 110 includes a schedule component 130 configured schedule execution of the workflow 120 across autonomous computational entities 140 (AUTONOMOUS COMPUTATIONAL ENTITY1-AUTONOMOUS COMPUTATOINAL ENTITYN, where N is an integer greater than 1) (e.g., processor-based machine, computer, virtual machine . . . ) (also referred to herein as computational entities 140). Where numerous autonomous computational entities 140 are available for use, execution can be performed concurrently. As a result, a workflow may be able to be executed faster than otherwise possible with a single autonomous computational entity 140 or group of serially executing autonomous computational entities 140.

The schedule component 130 includes a group component 132 and an allocation component 134 to schedule workflow execution optimally and automatically with respect to a plurality of autonomous computational entities 140. The group component 132 can identify a set of tasks with respect to each of a plurality of autonomous computational entities 140 as a function of one or more factors. Among other things, such factors can include computational cost and communication cost, wherein the computational cost and communication cost refer to the cost of executing a task on particular computational entities 140 and transmitting data to autonomous computational 140 entities, respectively, in terms of time and/or other things. Accordingly, the group component 132 can seek to balance the cost of computation with the cost of communication to reduce total execution time of a workflow. In other words, a balance can be struck between grouping tasks for execution on a single autonomous computational entity 140 and segmenting tasks for execution across multiple autonomous computational entities 140 to maximize throughput. Once a group or set of tasks is identified or otherwise determined by the group component 132, the allocation component 134 can communicate the tasks and requisite items to particular autonomous computational entities 140.

Computation and communication costs, among others, can be explicitly provided to, accessible by, and/or determined by the group component 132. In one instance, at least a portion of costs can be encoded within a workflow by a workflow developer, for example. Additionally or alternatively, actual or predicted costs can be stored in manner and location accessible by the group component 132. Still further yet, the group component 132, a sub-component, or some other communicatively coupled component (not shown) can determine or infer cost for example based on previous interactions and/or other specifics (e.g., processor speed, memory, network connection speed, network latency, load . . . ).

Workflow scheduling, and more specifically task grouping and/or segmentation, can be fined grained. In accordance with one embodiment, the workflow engine 110 can operate with respect to workflows that explicitly specify all dependencies between both tasks and items rather than utilizing implicit or hidden dependences or not specifying dependencies at all. Further, workflow engine 110 can store intermediate files or the like to anonymous locations (e.g., locations that are unknown prior to workflow execution) and in this manner force explicit specification of such dependencies. Conventional systems do not offer such complete dependency tracking. Typically, only task dependencies are expressed while item dependencies are disregarded completely. As a result, opportunities for concurrent execution are very limited, if at all possible. Here, however, dependencies can be exploited to allow grouping and/or segmenting at a task level. Moreover, the schedule component 130 need not be limited to simply scheduling concurrent execution of independent tasks. Dependent tasks can segmented and similarly executed concurrently if doing so is cost effective in terms of execution time, for instance, among other things. For example, dependencies can capture task interactions with critical resources or in other words resources that can only be used by one task or process at a time. Accordingly, availability of critical resources can be considered as a factor by the schedule component 130, and more particular group component 132, in determining how to group or segment tasks to ensure the same result is produced when a workflow is executed concurrently as when the workflow is executed serially.

The group component 132 and allocation component 134 of the schedule component 130 can additionally, or alternatively, utilize non-time or time-independent constraints in determining how to distribute a workflow 120 for execution. One time-independent constraint can pertain to security. Here, various security requirements can influence workflow scheduling. For example, when a developer signs a build, such a signing may require execution on a particular computer. Similarly, a security policy may require execution of certain tasks or operations within a firewall while others may be allowed to operate outside the firewall. Another time-independent constraint can relate to financial cost of execuretion. In this case, execution on one autonomous computational entity 140 may be financially more expensive to employ than another autonomous computational entity 140.

Yet another exemplary constraint can relate to hardware requirements. For instance, one or more tasks may require specific hardware to execute such as but not limited to a particular processor, processor speed, disk, disk speed, and or memory size. Still further, constraints can pertain to particular system or application software that is required to execute one or more tasks. Of course, these examples are not exhaustive, as there are many other time-independent constraints that can be taken into account. Furthermore, any number or combination of time and non-time based constraints can be employed to influence scheduling.

Certain requirements and/or capabilities are fixed meaning there is nothing a workflow system 100 can do to add or remove them (e.g., processor, memory, attached devices . . . ) while others can be modified (e.g., software). For those capabilities that can be modified, a transition graph with commands to perform the transition can be incorporated into a workflow. Further, various costs and/or weights can be associated with transitions as is done for other tasks in a workflow. Consequently, capability transitions can form part of regular task scheduling as described herein.

Figure 2:
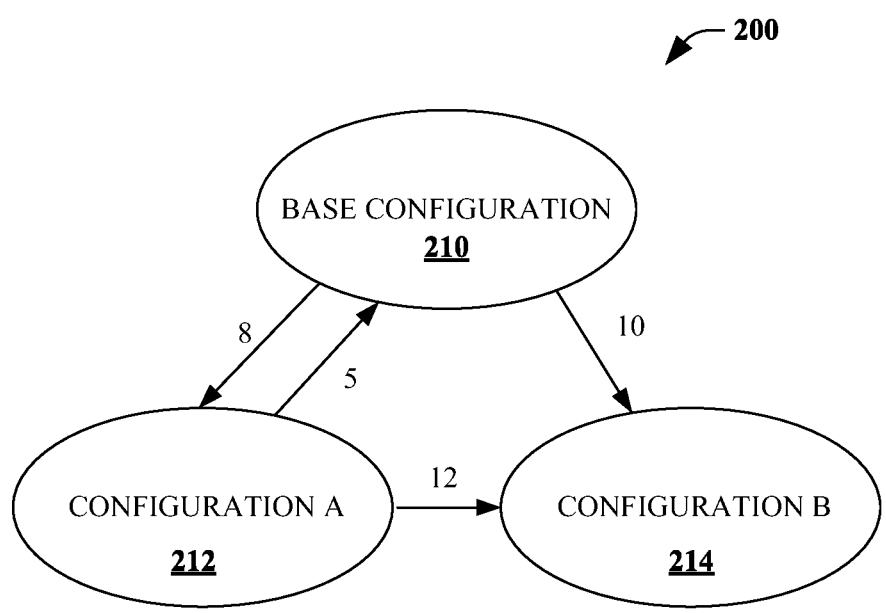
FIG. 2 illustrates an exemplary transition graph that can be incorporated into a workflow.

FIG. 2 illustrates an exemplary transition graph 200 that can be incorporated into a workflow. The transition graph 200 includes a plurality of nodes representing a number of computational entity configuration states and edges that identify costs associated with transitions between configuration states. Transitions and associated costs can correspond to installing, un-installing, upgrading, and/or downgrading software, for example.

The exemplary transition graph 200 includes three configuration states, namely a base configuration 210, configuration A 212, and configuration B 214. Such configurations can be associated with different software or different versions of the same software, among other things. For purposes of this example, computational entities can typically start with the base configuration 210. Further, note that once a machine is transitioned to configuration B 214 it cannot be reconfigured to the base configuration 210 or the configuration A 212 and as such, the transition cost can be set to infinite.

In light of the costs captured by transition graph 200, a workflow engine 110 might decide to start with a computational entity previously provisioned with configuration A 212 and transition the computational entity to configuration machine B 214 at a total cost of twelve units rather than start with a base configuration computational entity. However, the decision can depend on a holistic view of a workflow. For instance, there might be other tasks that still need configuration A 212 in which case it would be more expensive to transition a first computational entity to configuration B 214 and install configuration A 212 on second computational entity with a base configuration 210 at total cost of twenty units than to first schedule the tasks that require configuration A.

In accordance with one embodiment, the above-described transition state can be captured as items and tasks, as is done with respect to other portions of a workflow. However, here, transitions tasks include a side effect and are thus not idempotent. In other words, executing a transition task multiple times does not have the same effect as executing the task one time. This property of transition tasks can influence how such tasks are scheduled for execution, among other things as will be discussed further below.

Returning back to FIG. 1, the schedule component 130, via one or both of group component 132 and allocation component 134, can additionally control how data is to be afforded to tasks to optimize workflow execution further. By way of example and not limitation, data can be made accessible by way of a client/server model (e.g., central coordination) or a peer-to-peer-model.

Both of the client/server and peer-to-peer models have tradeoffs. The client/server model of data access is easy to employ since data is located in a central location. However, the client/server model is quite a bit slower than the peer-to-peer model, and care should be taken that the centrally located data is not modified by another process or other entity. In the peer-to-peer model, also called the local machine model, requisite data is initially copied or otherwise transmitted to an autonomous computational entity 140. The benefit is that data can be accessed quickly, and since data is local, there is no need to be as concerned with modification by another process or entity. Nevertheless, it is costly to transmit all data, especially sizable quantities. For example, suppose a workflow task operates over only a portion of an input file such as the header. In this situation, if the file is substantially large (e.g., several Megabytes) copying the entire file to an autonomous computational entity 140 can be much more expensive than accessing the file from a central location even give the costs associated therewith. If, however, the entire input file was going to be processed, it might be cheaper to in terms of overall execution time to transmit the substantially large file to the autonomous computational entity 140.

Further yet, the schedule component 130, for example by way of allocation component 134, can schedule redundant execution of tasks to expedite workflow execution, among other things. Many workflow tasks are idempotent. In other words, executing a task multiple times has the same effect as executing the task one time. Accordingly, the same task or group of tasks can be designated for execution on two or more autonomous computational entities 140, and the workflow engine 110 can select the result provided by the autonomous computational entity 140 that finishes execution first. More concretely, suppose one hundred computers are available and the workflow engine 110 determines that only sixty of the computers are needed to execute a workflow. Consequently, forty computers are available to duplicate computation at virtually no cost, and the workflow engine 110 can exploit the fact that for some reason one computer might execute tasks faster than another computer by scheduling redundant task execution.

Still further, the schedule component 130 or sub-components thereof can operate at different times. More specifically, task grouping and/or allocation can be performed statically prior to execution and/or dynamically at run time. In accordance with one embodiment, the scheduling can occur at the last moment prior to execution based on runtime information, for instance. In other words, rather than pre-determining where a task will run, such a determination can be delayed until that task actually needs to be run at which point current context information, among other things, can be utilized to schedule a task. For example, if there are twenty computational entities available and it can determine that a particular computational entity is very fast then a task or group of tasks can be scheduled for execution on that particular computational entity.

The schedule component 130 further includes a failure recovery component 136. Failure to complete execution can occur as a result of any number of hardware and/or software issues (e.g., disk failure, software crash/timeout . . . ). Typically, an entire workflow needs to be re-executed whenever a workflow fails to complete execution. In other words, a single failure or error no matter the size or significance will cause a conventional workflow engine to abort execution and start again from the beginning. Consequently, failure can inject significant delays into the overall execution time of a workflow. Further yet, the chance of failure in distributed systems in particular is substantial. For example, in a system of one thousand computers, roughly ten percent, or one hundred computers, will fail for some reason (e.g., crash, disc failure . . . ).

The failure recovery component 136 enables recovery from execution failure with minimal work. This can be accomplished by employing explicit dependency information encoded in a workflow, among other things. Upon the occurrence of a failure, execution of a particular task or group of tasks can be deemed to have failed, and dependency information can be utilized to identify dependent tasks that are potentially affected by the failure that can be re-scheduled for execution along with the failed task or group of tasks. Typically, tasks affected by the failure will be a subset of the entire workflow. Accordingly, only a portion of the workflow can be re-executed thereby limiting the delay injected by the failure.

In accordance with one embodiment, failure can be classified as a form of out-of-datedness or in other words an indication that at least part of the workflow has changed. Unlike conventional systems, changes can be defined as coarsely or finely as desired, and need not be time dependent. Further yet, custom definitions of changes are supported. Consequently, failures or the like can be defined as a change. Similar to failure recovery described above, once a change is detected, attention is turned to minimizing the amount of work needed to propagate the change and return to a consistent state, for example by employing workflow dependencies to confine re-execution to a subset of the workflow affected by the change.

Execution and/or re-execution by the workflow engine 110 can employ an incremental and fine-grained approach to minimize cost. This results at least because dependencies are precisely tracked and output is anonymous. In other words, workflows can explicitly as well as precisely encode dependencies rather than include implicit or hidden dependencies and/or coarse-grained dependencies, for example, and execution output can be saved to anonymous locations to at least strongly encourage explicit specification of dependencies. Furthermore, as part of this approach, work or state across single and/or multiple execution runs of the same and/or different workflows can be utilized to minimize the amount of computation that needs to be re-executed. More specifically, workflows or portions thereof (e.g., task or group of tasks) can be compared with workflows or portions thereof that have been previously executed without consideration of overall context (e.g., larger workflow, developer . . . ). If the workflows or portions are the same, the result of execution can simply be employed rather than initiating execution again. Stated differently, memoization can be employed to optimize workflow execution across runs, wherein the results of a set of tasks and/or items are recorded and simply returned for subsequent calls for execution over the set of tasks and/or items rather than re-computing the result.

By way of example and not limitation, consider compilation of a specific file, in a build system context, such as "system.string" by multiple developers for the same or different software product. The build system can know or otherwise determine that the developers are performing the same action on the same file. As a result, compilation output can be shared across developers and products. Various techniques can also be employed to dynamically detect that one or more tasks and/or items or groups thereof are the same such that output can be shared. For instance, some encoding or hashing can be applied to inputs and compared.

Additionally, the schedule component 130 can employ dependencies and previous state information to perform speculative execution with respect to changes or failures. By way of example and not limitation, consider a scenario in which there are two assemblies "A" and "B" and assembly "B" depends on assembly "A." Now assume that a file was changed or a failure occurred with respect to production of assembly "A." Conventionally, assembly "A" would have to be re-built and then and assembly "B" would be re-built (e.g., compilation task re-executed). However, it could be assumed that changes or other issues with respect to assembly "A" do not affect assembly "B" and assembly "B" could be built with a previous version of assembly "A," while assembly "A" is being re-built (e.g., concurrent execution). At the end, a check can be made and if it is determined that there was no change with respect to assembly "B," the output of the speculative build of assembly "B" can be utilized. If, however, it its determined that the was a change with respect to assembly "B," then assembly "B" would have to be rebuilt utilizing the new version of assembly "A."

In accordance with one embodiment, operation of the schedule component 130 can be hidden from a user of the workflow engine 110. A user can provide a single workflow for local and distributed execution, rather than requiring different workflows for varying types of execution. Further, scheduling can be performed automatically without user intervention. Accordingly, whether a workflow is scheduled for local or distributed execution can be transparent, or in other words, workflow functionality can be provided in a manner that is not evident to a user.

Figure 3:
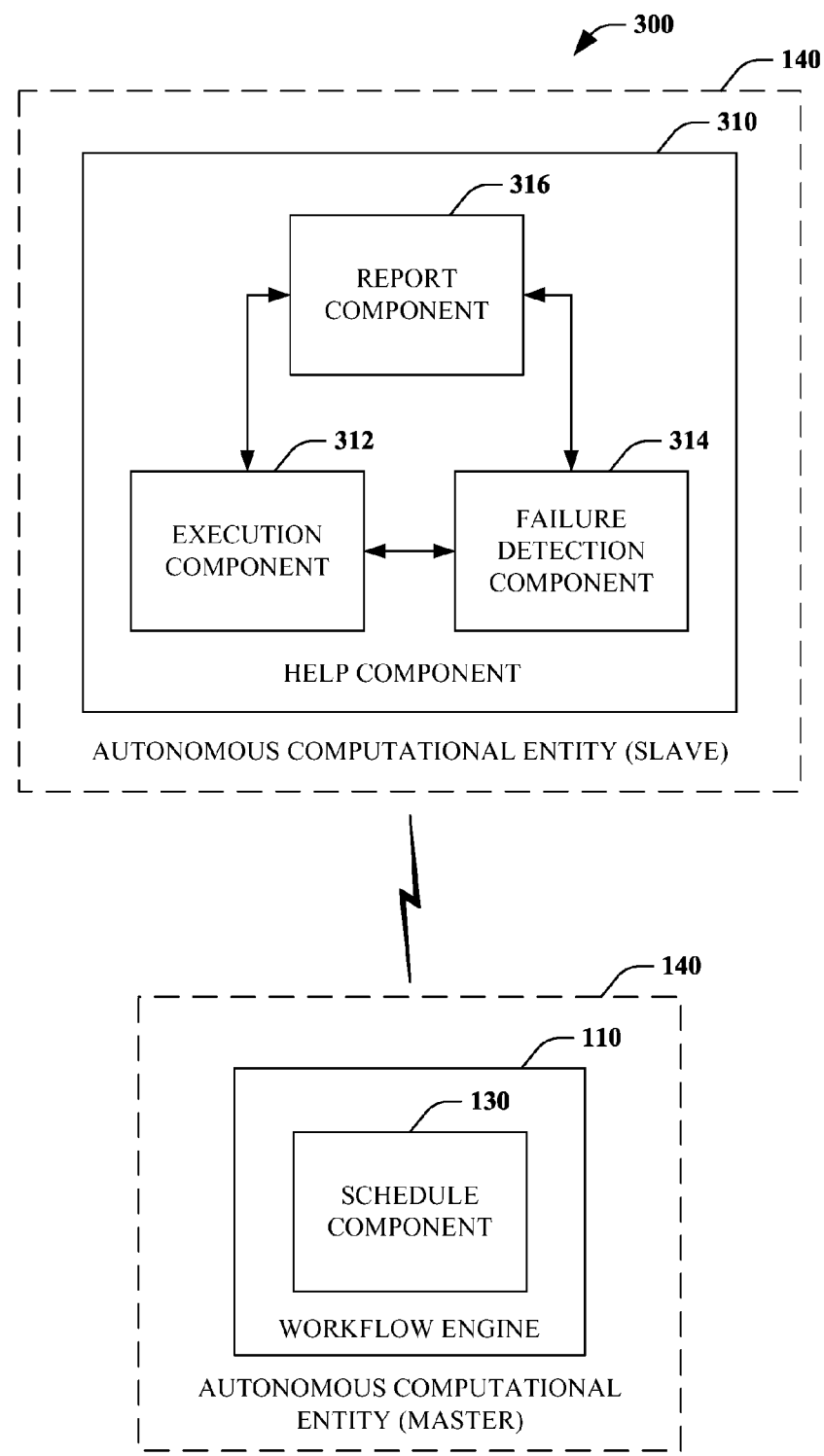
FIG. 3 is a block diagram of a master-slave configuration of a workflow system.

Turning attention to FIG. 3, a workflow system 300 is depicted in a master-slave configuration in accordance with one embodiment. The previously described workflow engine 110 and schedule component 130 can be incorporated into a single autonomous computational entity 140 to act as a master or controller with respect to one or more other autonomous computational entities 140 that act as a slave. To facilitate interaction, among other things, the computational entities 140 that are acting as slaves can include a help component 310 to facilitate workflow execution, among other things.

The help component 310 includes an execution component 312 configured to schedule or otherwise ensure execution of a workflow or portion thereof provided to the help component 310 by the workflow engine 110. As previously mentioned, where computation is split across computational entities, the likelihood of failure increases. Consequently, the help component 310 also includes a failure detection component 314 to identify failures or other unexpected conditions. For example, the failure detection component 314 can attempt to identify or infer problems as early as possible by, among other things, searching for crash windows or un-dismissed dialogs, examining exit codes associated with launched tasks or commands associated therewith, determining whether timeout commands are taking too long, as well as monitoring memory usage and error reporting. The help component 310 can also include a report component 316 to facilitate communicating the results of a computation and/or failures to the workflow engine 110.

Various actions can also be taken by the help component 310 to facilitate debugging. In one instance, report component 316 alone or in combination with the failure detection component 314 can capture and return state information upon identification of a failure. For example, screenshots can be taken upon failure, a memory dump can be captured, or if the computational entity was virtualized, a snapshot of the entire computational entity or state thereof can be captured. Additionally or alternatively, the help component can hold the autonomous computational entity 140 such that no other workflow tasks, commands or the like can be executed until debugging is complete.

The master-slave configuration of workflow system 300 is only exemplary and is not meant to limit the scope of the appended claims. Other configurations or communication models can also be employed including analogous functionality.

Figure 4:
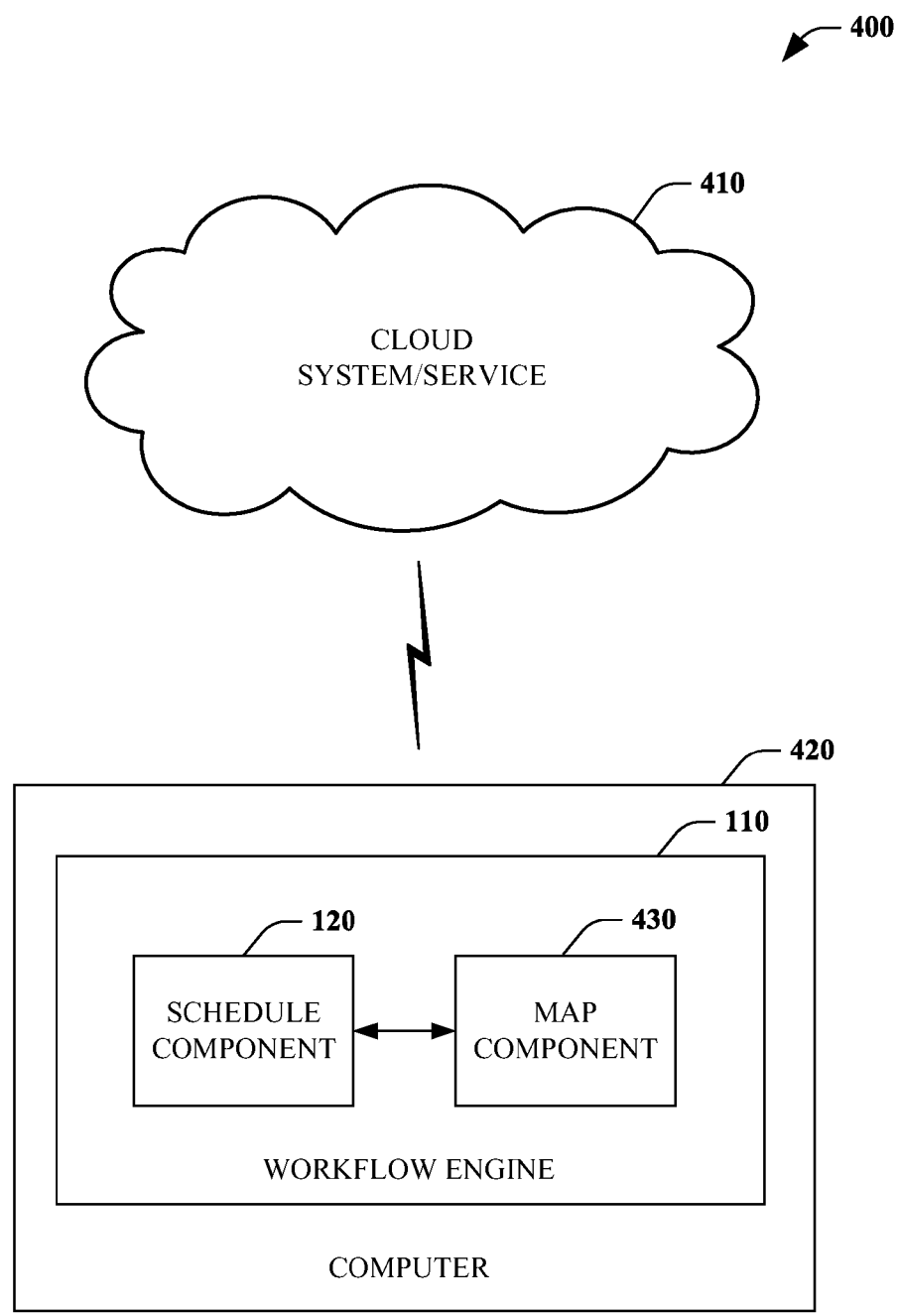
FIG. 4 is a block diagram of a workflow system that utilizes a cloud system/service.

In accordance with one embodiment, a workflow system 400 can utilize a cloud system/service 410 as shown in FIG. 4. The cloud system/service 410 provides a wide range of Internet-based services in which resources are shared and provided to computers or other devices on-demand like a public utility. More specifically, the cloud system/service 410 can provide access to a plurality of autonomous computational entities or compute nodes. Computer 420 includes the workflow engine 110 and schedule component 130 previously described, and can employ the autonomous computational entities provided by the cloud systems and/or services to execute a workflow concurrently.

The workflow engine 110 can operate with respect to different types or kinds of cloud system/service 410 including, among others, statically allocated and dynamically allocated systems. A statically allocated cloud system/service 410 simply provides access to a plurality of autonomous computational entities for use as one deems fit. In this scenario, the workflow engine 110 by way of schedule component 130 maintains responsibility for scheduling execution on the plurality of autonomous computational entities to reduce optimize execution, as previously described. A dynamically allocated cloud system/service 410, by contrast, accepts an execution plan from the workflow engine 110 and is itself responsible for scheduling execution of individual tasks, commands, or the like. Accordingly, the workflow engine 110 also includes a map component 430 to map, or in other words project, a workflow to an execution plan or other representation understood by the cloud system. Furthermore, the map component 430 can also incorporate hints or suggestions with respect to workflow scheduling into the execution plan, if supported. For example, computation cost and communication cost, among other things can be provided.

A user need not rely on a pre-existing cloud system/service to process workflows. In fact, a user can seek to build their own clouds or networks of autonomous computational entities. For example, colleagues and friends, among others can be solicited with respect to use of computational resources to facilitate distributed workflow execution. In this scenario, however, the distinction between idempotent tasks and tasks with side effects can be a factor that influences scheduling by the schedule component 130 of FIG. 3. More specifically, colleagues and friends will likely not want to allow execution of tasks with side effects such as those associated with installing, de-installing, up-grading, and/or downgrading software (e.g., transition tasks). However, the same people may allow their machines to be used for tasks that are do not have any side effects or are idempotent since there will be no current or long lasting effects their machines. Accordingly, another factor with respect to workflow scheduling can be a constraint that specifies whether or not tasks with side effects can be executed, for example.

Figure 5:
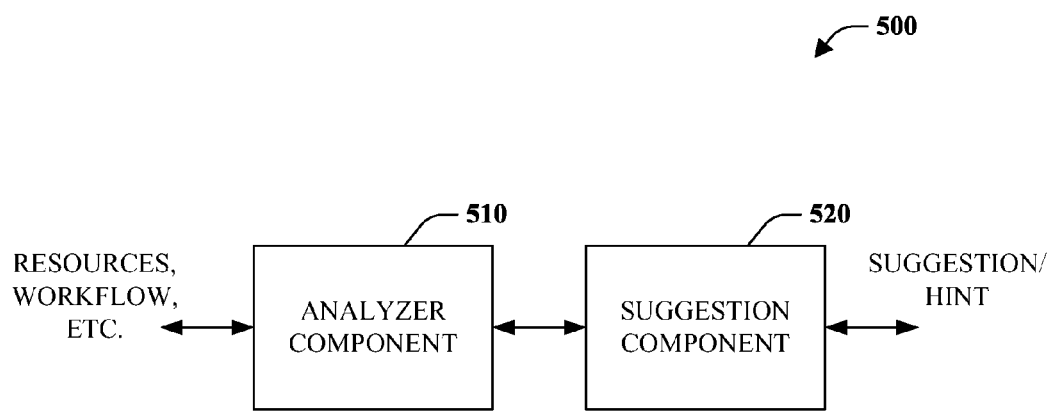
FIG. 5 is a block diagram of a resource recommendation system.

FIG. 5 illustrates a resource recommendation system 500 that can be employed to further optimize workflow execution. Workflow scheduling can be dictated by resource capabilities, or in other words scheduling needs to work around resource limitations. For example, if during workflow execution it is determined that a computer executes slowly, next time the workflow is executed that computer will likely be avoided in favor of another computer that is faster. Along the same lines of using previous workflow executions to optimize future runs, the resource recommendation system 500 can provide suggestions or recommendations as to how resources can be utilized or modified to optimize workflow execution. Such functionality can be included within autonomous computational entities such as part of the help component or form part of a more global component or system, among other things.

The resource recommendation system 500 includes an analyzer component 510 communicatively coupled to suggestion component 520. The analyzer component 510 can receive, retrieve, or otherwise acquire information about resources and a workflow, among other things. Based on the information acquired by the analyzer component 510, the suggestion component 520 provides a suggestion or recommendation regarding a change that could be made with respect to resources that can improve execution. For example, the suggestion component 520 could indicate that if a disk is replaced with a faster disk a workflow will run twenty percent faster.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the schedule component 130 can employ such technology to infer workflow groupings, allocations, and/or failures.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
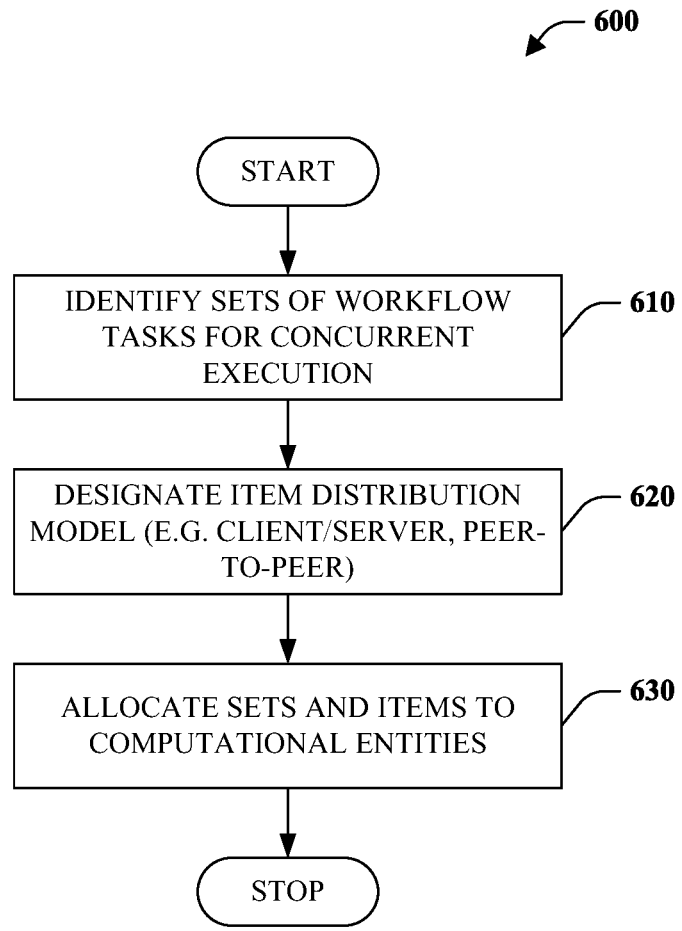
FIG. 6 is a flow chart diagram of a method of workflow scheduling.

Referring to FIG. 6, a flow chart diagram of a method of workflow scheduling 600 is illustrated. At reference numeral 610, a set of workflow tasks are identified for execution with respect to a plurality of autonomous computational entities as a function of one or more factors. Among others, such factors can include computational cost and communication cost, wherein the computational cost refers to cost of executing a task on particular autonomous computational entities 140, and communication cost pertains to the cost of transmitting data (e.g., items, code . . . ) to autonomous computational entities 140 in terms of time, for example, among other things. In one instance, such functionality can be implemented by applying a clique algorithm over a workflow graph including weights for various factors to determine cost. For example, the following factors, among others, can be taken into consideration: size of files to be communicated, network latency, processor speed, processor count, disk latency, disk speed, network speed, compressibility, processor activity, network activity, actual cost of executing a task (memory, processor, I/O reads/writes), explicitly specified task cost, and/or historical data from previous runs.

Another factor that can be considered here concerns critical resources or more specifically the availability thereof. Critical resources are a type of item that can be accessed by at most one task at any one time. Workflow dependencies can define interactions of tasks with respect to critical resources. Accordingly, when identifying tasks for concurrent execution, the availability of a critical resource can be considered to ensure that at most one task accesses the resource at any one time. Otherwise, semantics of a serially executed workflow may not be preserved when the workflow is concurrently executed.

At reference numeral 620, an item distribution model is designated. Items such as files can be distributed in accordance with various communication models including client/server and peer-to-peer, among others. Each model has its advantages and disadvantages. For example, in the client/server model execution can be slow since a client needs request data and wait for the response to be communicated from the server to the client. Nevertheless, the total amount of data communicated can be limited. By contrast, the peer-to-peer model allows much faster execution since data is local but requires entire files be initially transmitted and stored even when only a portion of the file is needed. The item distribution model can be selected based on a number of factors with respect to a workflow including the size of items, among other things, as well as network speed and latency and/or any of the other factors employed with respect to identify sets of tasks. For this reason, the designation of the item distribution model can be incorporated with identifying sets of tasks. In particular, the cost and benefits of each model can be weighed in the decision process. In addition, more than one model can be utilized with respect to a single workflow and designation can be made statically prior to execution and/or dynamically during workflow execution.

At reference numeral 630, the identified sets of tasks can be allocated or otherwise provided to particular autonomous computational entities for execution. Further, input items associated with the sets of tasks can be transmitted to appropriate autonomous computational entities where a peer-to-peer item distribution has been designated, for example.

Figure 7:
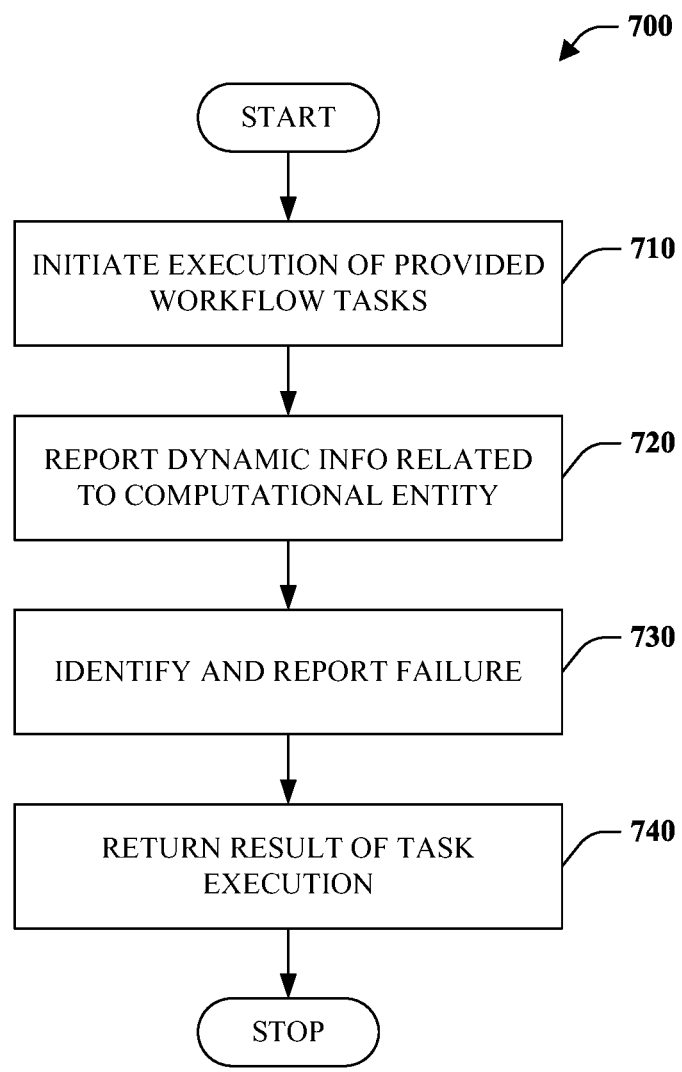
FIG. 7 is a flow chart diagram of a method of local workflow execution.

FIG. 7 illustrates a method 700 of local workflow execution that can be performed by the help component 310, for example. At reference numeral 710, execution of one or more provided workflow tasks is initiated on a local computational entity. At numeral 720, dynamic information pertaining to the local computational entity such as current load and processing speed, among others, are reported. Such information can be useful in scheduling distributed execution of tasks. For example, if a task as not yet been allocated to a particular computational entity, current load information can aid in determining whether or not to schedule a task on a particular computational entity. At 730, failure with respect to workflow execution is identified and reported. Failure can be identified by looking for crash windows, un-dismissed dialogs, as well as monitoring memory usage and execution logs, among other things. If failure is identified, it can be reported optionally with additional information (e.g., screenshots, memory dumps) to facilitate debugging. At numeral 740, results of task execution, if any, are returned. In one embodiment, such results can be persisted to an anonymous location and optionally transmitted by way of a peer-to-peer communication model to another computational entity as input to another task, for example.

Figure 8:
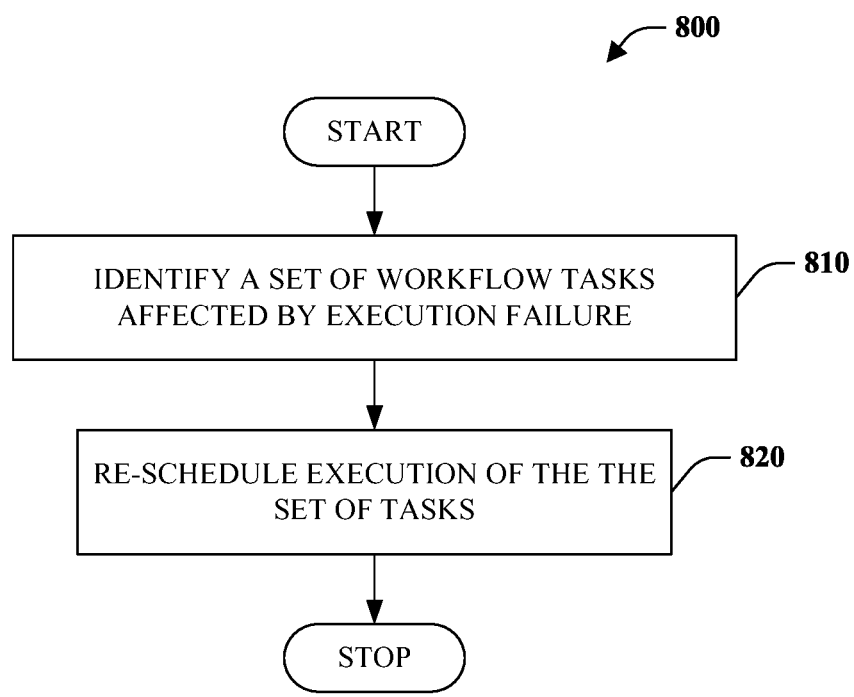
FIG. 8 is a flow chart diagram of a method of workflow failure recovery.

FIG. 8 depicts a method of workflow failure recovery. At reference numeral 810, a set of workflow tasks potentially affected by a failure is identified. For instance, once the failure is isolated to one or more tasks, tasks affected by the failure can be determined utilizing workflow dependencies. For example, if task "B" depends on task "A," then task "B" is affected by a failure with respect to task "A." Similarly, if task "A" and "B" were independent, a failure with respect to one task would not affect the other task. At numeral 820, the failed task and the set of tasks affected by the failure can be scheduled for re-execution. Further, state information (e.g., execution result) from different previous executions of the same or different workflow can be utilized to ensure re-execution is kept to a minimum. In other words, tasks can be pruned such that only those tasks were actually affected by the failure are re-executed. For example, a task dependent upon a failed task can also depend on one or more other tasks and rather than re-executing those tasks as well, the result of previous execution can be utilized instead.

Figure 9:
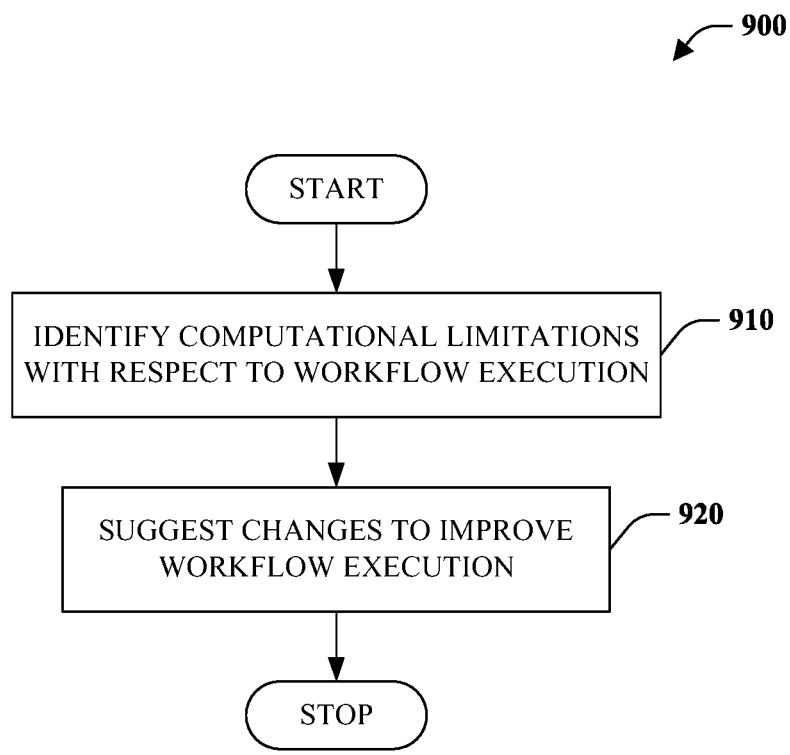
FIG. 9 is a flow chart diagram of a method of resource recommendation.

Referring to FIG. 9, a flow chart of a method for resource recommendation 900 illustrated. At reference numeral 910, computational limitations are identified with respect to workflow execution. For example, it can be determined that a disk is relatively slow to return data. Changes are suggested or recommended at numeral 910 based on the identified limitations. Continuing with the above example, a recommendation can be made to replace the disk with a faster disk. Further information can be provided regarding the improvement to be expected if a change is made. For instance, the recommendation can indicate that if the disk is replaced with a faster disk, the workflow can be executed twenty-percent faster. In sum, rather than simply working around computational limitations, a recommendation can be presented that, if implemented, can improve subsequent workflow execution.

As used herein, the terms "component," "system," and "engine" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

The term "cloud" is intended to refer to a communication network such as the Internet and underlying network infrastructure. Cloud computing generally pertains to Internet or cloud based applications or services including without limitation software as a service (SaaS), utility computing, web services, platform as a service (PaaS), and service commerce. Although not limited thereto, typically cloud services are available to clients via a web browser and network connection while the services are hosted on one or more Internet accessible servers.

"Persistent data" or the like is intended to refer to data stored on a non-volatile medium that exists across application sessions. In other words, the persistent data survives application startup and termination. By contrast, "transient data," often saved on a volatile medium such as memory, is created within or during an application session and is discarded at the end of the session. Similarly, the term "persist," or various forms thereof (e.g., persists, persisting, persisted . . . ), is intended to refer to storing data in a persistent form or as persistent data.

A "workflow" is a set of interrelated tasks that define the operational aspect of a process or procedure and can consume and/or produce one or more items (e.g., files, documents, executables, literals . . . ). A workflow can be generated, observed, reasoned about, and/or modified programmatically. Furthermore, a build system can be one instance of a workflow wherein tasks are performed to generate or build a program or file (e.g., installer, documentation . . . ). However, as used herein the term "workflow" is not intended refer to a program per se, wherein actions are performed with respect to various pieces of data.

The "workflow system" can be employed in many different contexts including but not limited to business/enterprise processes and computer software development or builds. Consequently, terminology can vary by context while the concept, feature, and/or functionality described remain the same. For example, the term "build" can be substituted for the word "workflow" herein when referring specifically to the software development context. As such, a workflow system can be referred to as a build system, a workflow engine can be referred to as a build engine, and a workflow can be referred to as a build. Similarly, tasks, items, inputs, and outputs, among other things, can understandably vary by context without in anyway suggesting limitations on the scope of the claimed subject matter or applicable context.

"Concurrent execution" or the like refers to processing at least a portion of tasks, workflows, commands, or computer instructions substantially simultaneously rather than sequentially. One form of concurrent execution includes parallel processing wherein processing occurs across two or more processors or cores on a single computer. Another form of concurrent execution includes distributed processing wherein processing occurs across two or more computers. Further, concurrent execution can encompass both parallel processing and distributed processing such that processing occurs across a plurality of computers and processors or cores.

"Critical resource" or the like refers a resource or item that can be used by at most one process or task at a time. Workflow dependencies can specify interactions between tasks and this particular type of item.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
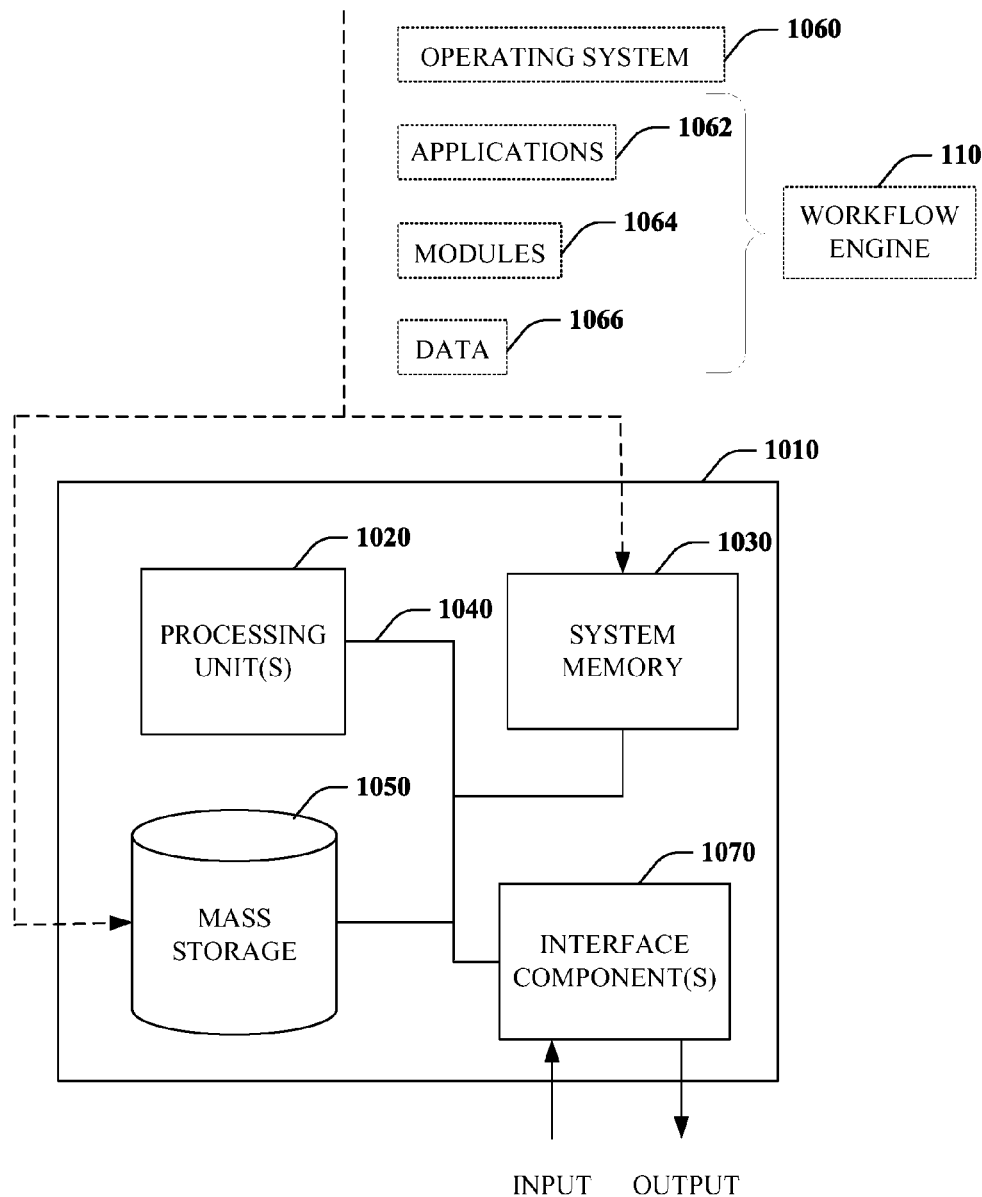
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example computer or computing device 1010 (e.g., desktop, laptop, server, hand-held, programmable consumer or industrial electronics, set-top box, game system . . . ). The computer 1010 includes one or more processing units or processors 1020, system memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to system memory 1030 that execute various computer executable actions, instructions, and or components.

The processing unit 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processing unit 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 1030 and mass storage 1050 are examples of computer-readable storage media. Depending on the exact configuration and type of computing device, system memory 1030 may be volatile (e.g., RAM), nonvolatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processing unit 1020, among other things.

Mass storage 1050 includes removable/non-removable, volatile/non-volatile computer storage media for storage of large amounts of data relative to the system memory 1030. For example, mass storage 1050 includes, but is not limited to, one or more devices such as a magnetic or optical disk drive, floppy disk drive, flash memory, solid-state drive, or memory stick.

System memory 1030 and mass storage 1050 can include or have stored therein operating system 1060, one or more applications 1062, one or more program modules 1064, and data 1066. The operating system 1060 acts to control and allocate resources of the computer 1010. Applications 1062 include one or both of system and application software and can leverage management of resources by operating system 1060 through program modules 1064 and data 1066 stored in system memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, workflow engine 110 including schedule component 130 can be an application 1062 or part of an application 1062 and include one or more modules 1064 and data 1066 stored in memory and/or mass storage 1050 whose functionality can be realized when executed by one or more processors or processing units 1020, as shown.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory, the processor configured to execute computer-executable instructions stored in the memory that are operable to cause the system to perform acts of:
receiving a software workflow comprising a plurality of tasks, a plurality of items including task input and output items, and explicitly encoded dependencies between the tasks and the items, wherein the tasks include a first compilation task that outputs a first assembly item and a second compilation task that outputs a second assembly item which depends on the first assembly item;

segmenting the plurality of tasks into a plurality of subsets for concurrent execution and scheduling the subsets on respective computational entities of a plurality of computational entities, wherein the segmenting and scheduling are performed automatically based on the dependencies and a plurality of cost factors including computation cost and communication cost;

allocating the subsets to the respective computational entities for execution; and initiating a failure recovery process in response to identifying a failed execution of the first compilation task at the respective computational entity allocated the first compilation task, the failure recovery process comprising:

identifying a previous version of the first assembly output by a previous successful execution of the first compilation task;

performing a speculative execution of the second compilation task using the previous version of the first assembly to output a speculative version of the second assembly;

re-executing, concurrently with the speculative execution of the second compilation task, the first compilation task to output a new version of the first assembly;

after successfully completing the speculative execution and the re-execution, determining whether or not a difference exists between the previous version and the new version of the first assembly which would change the second assembly output by the second compilation task; and either utilizing the speculative version of the second assembly in response determining the difference does not exist, or alternatively re-executing the second compilation task using the new version of the first assembly to output a new version of the second assembly in response determining the difference exists and utilizing the new version of the second assembly.

2. The system of claim 1, wherein the segmenting and the scheduling are further based on time independent constraints specifying specific processor or memory configurations required by one or more of the tasks.

3. The system of claim 1, wherein the segmenting of at least a portion of the workflow tasks is performed dynamically as a function of runtime information.

4. The system of claim 1, wherein the segmenting and the scheduling are further based on prior execution information.

5. The system of claim 1, wherein the allocating further comprises allocating at least one of the subsets of tasks redundantly to more than one of the computational entities.

6. The system of claim 1, wherein the computer-executable instructions are further operable, when executed, for initiating re-execution of one or more of the workflow tasks as a function of the dependencies.

7. The system of claim 6, wherein the computer-executable instructions are further operable, when executed, for initiating the re-execution of one or more of the tasks using results from previous executions of the workflow or a different workflow.

8. The system of claim 7, wherein the results include the previous version of the first assembly.

9. A method implemented by a computing system for facilitating efficient software execution, comprising:

the computing system receiving a software workflow comprising a plurality of tasks, a plurality of items including task input and output items, and explicitly encoded dependencies between the tasks and the items, wherein the tasks include a first compilation task that outputs a first assembly item and a second compilation task that outputs a second assembly item which depends on the first assembly item;

the computing system segmenting the plurality of tasks into a plurality of subsets for concurrent execution and scheduling the subsets on respective computational entities of a plurality of computational entities, wherein the segmenting and scheduling are performed automatically based on the dependencies and a plurality of cost factors including computation cost and communication cost;

the computing system allocating the subsets to the respective computational entities for execution; and the computing system initiating a failure recovery process in response to identifying a failed execution of the first compilation task at the respective computational entity allocated the first compilation task, the failure recovery process comprising:

the computing system identifying a previous version of the first assembly output by a previous successful execution of the first compilation task;

the computing system performing a speculative execution of the second compilation task using the previous version of the first assembly to output a speculative version of the second assembly;

the computing system re-executing, concurrently with the speculative execution of the second compilation task, the first compilation task to output a new version of the first assembly;

the computing system, after successfully completing the speculative execution and the re-execution, determining whether or not a difference exists between the previous version and the new version of the first assembly which would change the second assembly output by the second compilation task; and the computing system, either utilizing the speculative version of the second assembly in response determining the difference does not exist, or alternatively re-executing the second compilation task using the new version of the first assembly to output a new version of the second assembly in response determining the difference exists and utilizing the new version of the second assembly.

10. The method of claim 9, further comprising initiating re-execution of one or more of the tasks as a function of the dependencies.

11. The method of claim 10, further comprising initiating the re-execution using results from previous executions of the software workflow or a different software workflow.

12. The method of claim 11, wherein the results include the previous version of the first assembly.

13. The method of claim 9, wherein the segmenting is performed dynamically during execution of a portion of the workflow.

14. The method of claim 9, wherein the segmenting and the scheduling are further based on one or more time independent constraints.

15. The method of claim 9, further comprising designating a distribution model which specifies that the items are communicated amongst tasks with or without central coordination as a function of the computational cost and the communication cost.

16. A system, comprising:
means for receiving a software workflow, wherein the workflow includes a plurality of tasks, a plurality of items including task input and output items, and explicitly encoded dependencies between the tasks and the items, wherein the tasks include a first compilation task that outputs a first assembly item and a second compilation task that outputs a second assembly item which depends on the first assembly item;
means for segmenting a plurality of tasks into a plurality of subsets for concurrent execution;
means for scheduling the subsets on respective computational entities of a plurality of computational entities, wherein the segmenting and scheduling are performed automatically based on the dependencies and a plurality of cost factors including computation cost and communication cost;
means for allocating the subsets to respective computational entities for execution; and
means for initiating a failure recovery process in response to identifying a failed execution of the first compilation task at the respective computational entity allocated the first compilation task, wherein the failure recovery process is initiated in response to identifying a failed execution of the first compilation task at the respective computational entity allocated the first compilation task,
wherein the failure recovery process includes:
identifying a previous version of the first assembly output by a previous successful execution of the first compilation task;
performing a speculative execution of the second compilation task using the previous version of the first assembly to output a speculative version of the second assembly;
re-executing, concurrently with the speculative execution of the second compilation task, the first compilation task to output a new version of the first assembly;
after successfully completing the speculative execution and the re-execution, determining whether or not a difference exists between the previous version and the new version of the first assembly which would change the second assembly output by the second compilation task; and
either utilizing the speculative version of the second assembly in response determining the difference does not exist, or alternatively re-executing the second compilation task using the new version of the first assembly to output a new version of the second assembly in response determining the difference exists and utilizing the new version of the second assembly.

17. The system of claim 16, wherein the means for segmenting and the means for scheduling include time independent constraints specifying specific processor or memory configurations required by one or more of the tasks.

18. The system of claim 16, wherein the means for segmenting is performed dynamically as a function of runtime information.

19. The system of claim 16, wherein the means for segmenting and the means for scheduling are utilize prior execution information.

20. The system of claim 16, wherein the means for allocating allocates at least one of the subsets of tasks redundantly to more than one of the computational entities.

21. The system of claim 16, wherein the system further includes means for initiating re-execution of one or more of the workflow tasks, and wherein the means for initiating re-execution of one or more of the workflow initiates re-execution of the one or more workflows as a function of the dependencies.

22. The system of claim 21, wherein the re-execution of one or more of the workflow tasks utilizes results from previous executions of the workflow or a different workflow.

23. The system of claim 22, wherein the results include the previous version of the first assembly.

* * * * *